United States Patent [19]

Fishgal

[11] 4,279,751
[45] Jul. 21, 1981

[54] HYDRAULIC SYSTEM

[76] Inventor: Semyon I. Fishgal, 610-60 Mountview Ave., Toronto, M6P 2L4, Canada

[21] Appl. No.: 21,025

[22] Filed: Mar. 16, 1979

[51] Int. Cl.³ ................... B01D 33/00; B01D 35/20
[52] U.S. Cl. ........................... 210/388; 204/299 R; 210/443; 210/510; 210/785
[58] Field of Search ............. 60/453, 454; 204/180 R, 204/299; 210/443, 444, 506, 510, DIG. 22, 388, DIG. 18; 310/DIG. 1, 311, 358

[56] References Cited

U.S. PATENT DOCUMENTS

| 2,708,244 | 5/1955 | Jaffe | 310/358 |
| 3,415,735 | 12/1968 | Brown et al. | 204/99 X |
| 3,478,883 | 11/1969 | Deluca, Jr. | 210/388 X |
| 3,870,640 | 3/1975 | Reece | 210/388 |
| 3,945,208 | 3/1976 | O'Connor | 60/420 |

Primary Examiner—Irwin C. Cohen

[57] ABSTRACT

A hydraulic system including a working-liquid pressure line and drain line communicated accordingly with an inlet and outlet of a housing into which a porous piezoelectric ceramic filtering element, such as barium titanate, is placed, connected to a generator of electric oscillations and separates said inlet and outlet.

1 Claim, 1 Drawing Figure

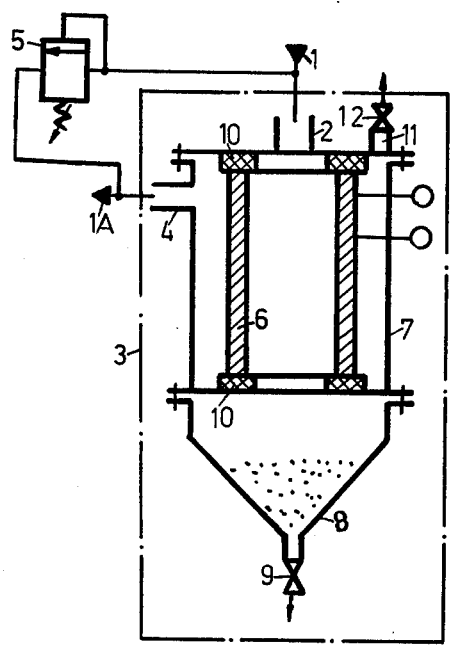

HYDRAULIC SYSTEM

BACKGROUND OF THE INVENTION

This invention relates to hydraulic systems, such as power, cooling, cutting, etc., including a working-liquid pressure line and drain line communicated accordingly with a means for maintaining the working properties of the liquid.

The latter means in known such systems (Dudley A. Pease. Basic Fluid Power, Prentice-Hall, Inc., Eglewood Cliffs, N.J., 1967; Franklin D. Yeaple. Hydraulic and Pneumatic Power and Control, McGraw-Hill Book Co., New York, 1966; U.S. Pat. No. 3,945,208, etc.) removes solid contaminants from working liquid by filtering, straining, gravitational displacement, centrifugal separation, etc. with full flow and bypass (5-20% of the flow).

It is well known that reliability and longevity of hydraulic systems, in many respects, depend on the working properties of the used liquids.

These properties are determined by the presence of the solid, gaseous and liquid contaminants in the liquid, their fineness and the state of their dispersion.

The solid contaminants are the products of wear (metal filings, rubber, etc.) and oxidation of both the hydraulic units and the working liquid itself, or are the dust (the most destroying contaminant) from the atmosphere.

The intensity of the contamination from the atmosphere in hydraulic systems (especially those of farm, road-making, construction and the like machinery) depends on liquid volume oscillations in their tanks when operating. The oscillations are basically dictated by the work of their hydraulic cylinders and accumulators.

The matter is not only that the solid contaminants are abrasive, cause wear and decrease the term of hydraulic unit service many times, but they may wedge movable tailings (especially the plunger ones) and be the cause of the inoperativeness of automatic controls.

The gaseous contaminants (mainly air and water vapor) are absorbed from the atmosphere (as above) and deteriorate the pliability of hydraulic systems, their triggering, stability, causing also inoperativeness.

Oxygen solubility in liquid being higher than that of atmosphere air, the dissolved air contains 40-50% more oxygen, and the oxidation of hydraulic units and liquid is intensified.

Also, gas forms foam oxidizing still more because of bigger interface and more oxygen content. In time, the stable foam forms viscous contaminants depositing on the surfaces of hydraulic units. Foam-forming is sharply increased by water presence, even at only 0.1% water.

Gas is always present in liquid, at least in a dissolved form, and usually does not affect liquid mechanical properties. But vibration, decreasing pressure and heating give the gas off (even with foaming) and form an inoperative gas-liquid mixture instead of the former solution fitted for work. That is why the problem especially arises in hydraulic systems of vehicles when the systems remaining inoperative are subjected to jarring and vibration. This may aggravate starting such a hydraulic system.

Water contaminants come into "breathing" tanks (as described above) in vapor form and condense when temperature drops, with the deteriorating effects described above.

Mentioned known filtrating means remove only solid contaminants with the size of the solids being more than the clearance in sliding pairs of hydraulic units. Here the clearance is usually expressed in terms of the difference between the diameter of a hole and the diameter of the mating part which assembles into it, e.g. the difference between the diameters of a cylinder and plunger. In many cases this is achieved by fine-mesh bypass filters consuming energy and requiring frequent change because of their clogging and, in some areas, becoming a repository for biological growth.

SUMMARY OF THE INVENTION

The objective of this invention is to relieve the rigid requirements of filtration not only without increasing harmful effects of contaminants, but with improving the working properties of both the working liquid and hydraulic units.

The above objective is attained in that said means for maintaining the working properties of liquids constitutes a porous piezoelectric ceramic filtering element, such as barium titanate, connected to a generator of electric oscillations and placed into a housing in which inlet and outlet are separated by said element.

Thus, besides being a filter, the latter represents also an (ultra)sonic transducer eliminating clogging, allowing significant increase of the size of the calibrating channels, breaking down contaminants to a non-interfering particle size (less than said clearance) and dispersing them in the liquid.

The dispersed particles (in most cases less than 5 mkm)

(1) improve the antifrictional properties of rubbing components by means of filling the cavities of worn and defective surfaces, smoothing and restoring the latter, extending the actual contact area, increasing heat transfer between the surfaces, reducing pressure between them and the influence of microseizure and other undesirable frictional effects;

(2) decrease the electrostatic component of wear as the particles absorb the products of oil oxidation and increase the electric conductivity of oil;

(3) add fire safety as electrostatic electricity accumulation is decreased for the above reasons;

(4) improve oil quality in response to silent discharges between metallic particles;

(5) improve the factors of acidity (characterizing the degree of oil oxidation) and alkalinity (characterizing undepleted additives) of oil by 20-50% of their initial value;

(6) decrease sliming on the working surfaces of hydraulic units by 20-50%;

(7) double the time between oil changes.

Thus, the present invention not only diminishes rigid requirements of filtration, but improves the system as a whole, increases its longevity and improves the antifrictional properties of rubbing components.

This performance far exceeds that of conventional filter systems (e.g. bypass filters) which this invention replaces.

Tests showed at least double time between oil changes, savings in maintenance, filter changes and system down time.

Also, the ultrasonic transducer of the present invention has known emulsifying action and, therefore, produces a working water-in-oil emulsion from water contaminants or improves water-oil fire-resistant hydraulic liquids, e.g. for coal-mining equipment.

Besides, said transducer liberates gas from liquid and can be equipped with a gas trap.

Thus, only one device decontaminates hydraulic liquid from all kinds of contaminants.

BRIEF DESCRIPTION OF THE DRAWINGS

The lone FIGURE schematic representation of a hydraulic system using the present invention.

DESCRIPTION OF THE PREFERRED EMBODIMENT

A hydraulic system of the present invention includes a working-liquid pressure line 1 communicated with the inlet 2 of a means 3 for maintaining the working properties of hydraulic liquid. The outlet 4 of the means 3 is connected to a receiver (not shown) via a drain line 1A.

In most hydraulic power systems, after performing its hydraulic functions within a machine (not shown), the liquid is delivered into the receiver (in this case, a tank) through the line 1, inlet 2, the means 3 and outlet 4.

A conventional coarse full-flow filter can be also used in the system (not shown) along with the means 3 for maintaining the working properties of hydraulic liquid.

The system can be provided with a bypass line interconnecting the means 3 with the receiver by means of a variable-pressure bypass valve 5.

The means 3 for maintaining the working properties of liquid constitutes a porous piezoelectric ceramic filtering element 6, such as barium titanate, placed into a housing 7 in which inlet 2 and outlet 4 are separated by the element 6.

The latter is shaped as a hollow cylinder with its internal and external lateral surfaces coated with a metallic conductor, e.g. silver or copper. The metallized surfaces are connected to a generator of electric oscillations (not shown).

The housing 7 is provided with a sediment bowl 8 and a valve 9. Pressurization of the element 6 in the housing 7 is achieved with sealings 10.

During operation, working liquid is pumped through the means 3, the excess proceeding through the relief valve 5 whose pressure setting corresponds to the required pressure.

The means 3 for maintaining the working properties of the liquid performs several functions.

As any filter does, it separates foreign matter from the liquid entering the receiver. Being also an (ultra)sonic transducer, the filtering element 6 is not clogged because of an acoustic barrier near the vibrating surfaces. At working frequencies above 25 kilocycles, the coagulation action of ultrasonics settles down solid contaminants into the sediment bowl 8, from which they are periodically removed through the valve 9. The transducer also breaks down solid contaminants (to a non-interfereing size - less than the clearance between sliding mating parts of hydraulic units) by means of mechanical impacts and cavitation, the solid contaminants being dispersed into oil. If water is present in an oil as the contaminant or component (when a water-in-oil emulsion is used), water particles are also dispersed, the better emulsion being prepared.

The physical changes induced by intense ultrasonic radiation are caused by heat, cavitation, steady ultrasonic forces (weak, however, compared with the cavitation forces) and large mechanical stresses (due to cavitation and ultrasonic waves).

The suspended solids scatter some incidental radiation, thereby giving rise to an energy density gradient across themselves. The solids being smaller than a wavelength of ultrasonic oscillations, the resulting radiation pressure is small (unless they are in a standing wave system and tend to accumulate there in bands situated half a wavelength apart).

Besides an alternating wave force, particles are subjected to a steady force appearing since the viscosity of the liquid does not remain constant over a pressure cycle with temperature variations.

The motion of the particles depends on their size and mass (larger particles oscillate with a smaller amplitude). The amplitude difference also increases probability of mutual collision of particles.

The element 6 can work at developed cavitation. Cavities collapsing, liquid particles move to a bubble center with a great speed. As a result, their kinetic energy causes local hydraulic impacts accompanied by high temperature and pressure conditions. Foreign particles are cavitation nuclei, the pressure pulses generated right where needed for their break-down. Therefore, the energy is transferred directly with minimum divergence. The required energy is relatively modest, but concentrated over a small area and produces very high local stresses.

It is precisely the dispersion effect of the element 6 that allows the effects mentioned in the Summary of the Invention to be achieved.

Decreasing solubility under falling pressure and elevating temperature, increased free liquid surface and agitation, bringing gases to the surface, cause degassing of the liquid. Liberated gas is collected in a gas trap 11 and removed by opening a valve 12.

It should be taken into account that high-intensity ultrasonics can break down long hydrocarbonic chains of viscous additives of some hydraulic liquids.

It is obvious that many modifications and adaptations can be made without departing from the spirit and scope of the invention.

What is claimed is:

1. A flow-line filtration system for a liquid containing suspended solids comprising a housing having a liquid inlet port and a liquid outlet port, a porous piezoelectric ceramic filtering element having working surfaces thereon and located in the housing in the flow path of the liquid, partitioning the housing into an input part and an output part, a metallic coating on said working surfaces, and a generator of electric oscillations connected to said metallic coating whereby foreign matter in the liquid is removed by the filter and vibration of the filter effected by the generator of electric oscillation prevents clogging of the filter.

* * * * *